US012574170B2

(12) United States Patent
Gao et al.

(10) Patent No.: US 12,574,170 B2
(45) Date of Patent: Mar. 10, 2026

(54) METHOD, DEVICE AND COMPUTER STORAGE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 502 days.

(21) Appl. No.: 18/004,189

(22) PCT Filed: Jul. 6, 2020

(86) PCT No.: PCT/CN2020/100434
§ 371 (c)(1),
(2) Date: Jan. 4, 2023

(87) PCT Pub. No.: WO2022/006708
PCT Pub. Date: Jan. 13, 2022

(65) Prior Publication Data
US 2023/0269039 A1 Aug. 24, 2023

(51) Int. Cl.
*H04L 5/00* (2006.01)
*H04W 72/20* (2023.01)
*H04W 72/232* (2023.01)

(52) U.S. Cl.
CPC ............ *H04L 5/001* (2013.01); *H04L 5/0053* (2013.01); *H04W 72/232* (2023.01)

(58) Field of Classification Search
CPC .... H04L 5/001; H04L 5/0053; H04W 72/232; H04W 72/535
See application file for complete search history.

(56) References Cited

U.S. PATENT DOCUMENTS

2011/0149879 A1* 6/2011 Noriega .............. H04W 72/543
370/329
2012/0039252 A1* 2/2012 Damnjanovic ....... H04L 5/0057
370/328
(Continued)

FOREIGN PATENT DOCUMENTS

JP 2020516193 A 5/2020
WO 2019137226 A1 7/2019
(Continued)

OTHER PUBLICATIONS

3GPP TSG RAN WG1 Meeting#92, R1-1801720 Title:Remaining issues on CSI reposting (Year: 2018).*
(Continued)

*Primary Examiner* — Faruk Hamza
*Assistant Examiner* — Abusayeed M Haque
(74) *Attorney, Agent, or Firm* — Sughrue Mion, PLLC

(57) ABSTRACT

Embodiments of the present disclosure relate to methods, devices and computer storage media for communication. A method comprises transmitting, from a network device to a terminal device, downlink control information for scheduling transmissions of data and channel state information (CSI) from the terminal device; receiving the data from the terminal device based on a first slot offset configured for uplink data transmission or a second slot offset configured for the CSI; and receiving the CSI from the terminal device based on the second slot offset. As such, in case of higher frequency band with larger subcarrier spacing, embodiments of the present disclosure can support uplink data scheduling and A-CSI report triggering with same DCI.

8 Claims, 6 Drawing Sheets

(56) References Cited

U.S. PATENT DOCUMENTS

2020/0045696 A1 * 2/2020 Huang .................. H04L 5/0007
2020/0367080 A1 * 11/2020 Salah ................ H04W 72/1273

FOREIGN PATENT DOCUMENTS

| | | | |
|---|---|---|---|
| WO | 2019/191871 | A1 | 10/2019 |
| WO | 2020041421 | A1 | 2/2020 |
| WO | 2020/085880 | A1 | 4/2020 |
| WO | 2020/110098 | A1 | 6/2020 |

OTHER PUBLICATIONS

Communication dated Mar. 12, 2024 issued by the Japanese Patent Office in application No. 2023-500443.
Huawei, HiSilicon, "Remaining Issues on CSI Reporting", Discussion and Decision, 3GPP TSG RAN WG1 Meeting #92, Athens, Greece, Feb. 26-Mar. 2, 2018, R1-1801452, 11 pages.
CATT. R1-1801720, "Remaining issues on CSI reporting", 3GPP TSG RAN WG1 Meeting #92, 2018, 3 pages.
International Search Report of PCT/CN2020/100434 dated Mar. 25, 2021 [PCT/ISA/210].

* cited by examiner

200

600

610

TRANSMIT DCI FOR SCHEDULING TRANSMISSIONS OF DATA AND CSI

620

RECEIVE THE DATA
BASED ON A FIRST SLOT OFFSET OR A SECOND SLOT OFFSET

630

RECEIVE THE CSI BASED ON THE SECOND SLOT OFFSET

700

710

RECEIVE DCI FOR SCHEDULING TRANSMISSIONS OF DATA AND CSI

720

TRANSMIT THE DATA
BASED ON A FIRST SLOT OFFSET OR A SECOND SLOT OFFSET

730

TRANSMIT THE CSI BASED ON THE SECOND SLOT OFFSET

METHOD, DEVICE AND COMPUTER STORAGE MEDIUM FOR COMMUNICATION

TECHNICAL FIELD

Embodiments of the present disclosure generally relate to the field of telecommunication, and in particular, to methods, devices and computer storage media for communication.

BACKGROUND

In the 3GPP meeting RAN #86, it is agreed to support new radio (NR) operations beyond 52.6 GHz. Required changes to support NR operations between 52.6 GHz and 71 GHz by leveraging existing uplink/downlink NR waveform have been studied. For example, applicable numerologies including larger subcarrier spacing, higher channel bandwidth and their impacts on the frequency range 2 (FR2) physical layer design have been studied to support system functionalities considering practical radio frequency (RF) impairments.

Different slot offsets can be configured for transmissions of uplink data and a channel state information (CSI) report. However, in case of higher frequency band with larger subcarrier spacing, the slot offsets defined in accordance with current ranges may be not sufficient to prepare the uplink data and/or the CSI report. Currently, if a terminal device is scheduled by downlink control information (DCI) to transmit uplink data and a CSI report on a same Physical Uplink Shared Channel (PUSCH), the slot offset for the PUSCH carrying both the uplink data and the CSI report can be determined based on the slot offset configured for uplink data transmission. However, in case of higher frequency band with larger subcarrier spacing, the slot offset configured for the uplink data transmission may be not sufficient for the terminal device to prepare the CSI report.

SUMMARY

In general, example embodiments of the present disclosure provide methods, devices and computer storage media for communication.

In a first aspect, there is provided a method of communication. The method comprises transmitting, from a network device to a terminal device, downlink control information for scheduling transmissions of data and CSI from the terminal device; receiving the data from the terminal device based on a first slot offset configured for uplink data transmission or a second slot offset configured for the CSI; and receiving the CSI from the terminal device based on the second slot offset.

In a second aspect, there is provided a method of communication. The method comprises receiving, at a terminal device and from a network device, downlink control information for scheduling transmissions of data and CSI from the terminal device; transmitting the data to the network device based on a first slot offset configured for uplink data transmission or a second slot offset configured for the CSI; and transmitting the CSI to the network device based on the second slot offset.

In a third aspect, there is provided a network device. The network device comprises a processor and a memory coupled to the processor. The memory stores instructions that when executed by the processor, cause the network device to perform actions. The actions comprise transmitting, to a terminal device, downlink control information for scheduling transmissions of data and CSI from the terminal device; receiving the data from the terminal device based on a first slot offset configured for uplink data transmission or a second slot offset configured for the CSI; and receiving the CSI from the terminal device based on the second slot offset.

In a fourth aspect, there is provided a terminal device. The terminal device comprises a processor and a memory coupled to the processor. The memory stores instructions that when executed by the processor, cause the terminal device to perform actions. The actions comprise receiving, from a network device, downlink control information for scheduling transmissions of data and CSI from the terminal device; transmitting the data to the network device based on a first slot offset configured for uplink data transmission or a second slot offset configured for the CSI; and transmitting the CSI to the network device based on the second slot offset.

In a fifth aspect, there is provided a computer readable medium having instructions stored thereon. The instructions, when executed on at least one processor, cause the at least one processor to perform the method according to the above first or second aspect.

In a sixth aspect, there is provided a computer program product that is stored on a computer readable medium and includes machine-executable instructions. The machine-executable instructions, when being executed, cause a machine to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
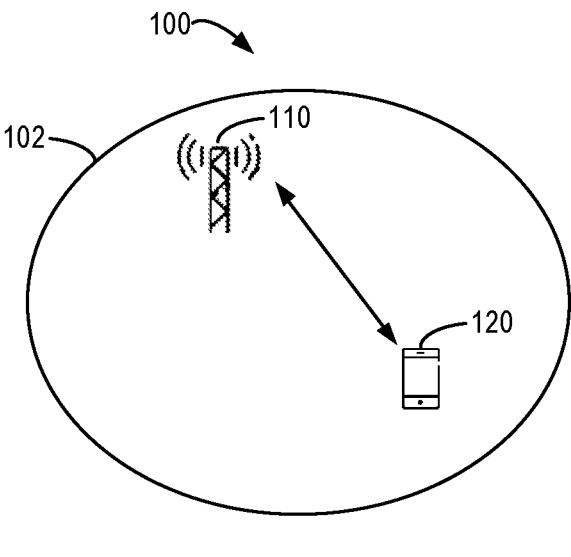
FIG. 1 illustrate an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest', 'minimum', 'maximum,' or the like. It will be appreciated that such descriptions are intended to indicate that a selection among many used functional alternatives can be made, and such selections need not be better, smaller, higher, or otherwise preferable to other selections.

As described above, in the 3GPP meeting RAN #86, it is agreed to support NR operations beyond 52.6 GHz. Required changes to support NR operations between 52.6 GHz and 71 GHz by leveraging existing uplink/downlink NR waveform have been studied. For example, applicable numerologies including larger subcarrier spacing, higher channel bandwidth and their impacts on the FR2 physical layer design have been studied to support system functionalities considering practical RF impairments.

Different slot offsets can be configured to user equipment (UE) for transmissions of uplink data and a CSI report. For example, a slot offset ranging from 0~32 slots can be configured for uplink data transmission, which denotes a time interval between reception of an uplink grant (such as, DCI) on a Physical Downlink Control Channel (PDCCH) and transmission of uplink data on a PUSCH. Another slot offset ranging from 0~32 slots can be configured for an aperiodic CSI (A-CSI) report, which denotes a time interval between reception of a trigger (such as, DCI) for the A-CSI report and transmission of the A-CSI report. Prior to transmit the uplink data, the UE may need some time to prepare the uplink data, which is referred to as "PUSCH preparation time". Prior to transmit the CSI report, the UE needs some time to compute the CSI, which is referred to as "CSI computation time".

Regarding the CSI computation time, Clause 5.4 of the 3GPP specification TS 38.214 specifies that when the CSI request field on a DCI triggers a CSI report(s) on PUSCH, the UE shall provide a valid CSI report for the n-th triggered report, if the first uplink symbol to carry the corresponding CSI report(s) including the effect of the timing advance, starts no earlier than at symbol $Z_{ref}$, and if the first uplink symbol to carry the n-th CSI report including the effect of the timing advance, starts no earlier than at symbol $Z'_{ref}(n)$, where $Z_{ref}$ is defined as the next uplink symbol with its CP starting $T_{proc,CSI}=(Z)(2048+144)\cdot\kappa 2^{-\mu}\cdot T_C$ after the end of the last symbol of the PDCCH triggering the CSI report(s), and where $Z'_{ref}(n)$ is defined as the next uplink symbol with its CP starting $T'_{proc,CSI}=(Z')(2048+144)\cdot\kappa 2^{-\mu}\cdot T_C$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report.

If the PUSCH indicated by the DCI is overlapping with another PUCCH or PUSCH, then the CSI report(s) are multiplexed following the procedure in Clause 9.2.5 of TS 38.213 and Clause 5.2.5 of TS 38.214 when applicable, otherwise the CSI report(s) are transmitted on the PUSCH indicated by the DCI.

When the CSI request field on a DCI triggers a CSI report(s) on PUSCH, if the first uplink symbol to carry the corresponding CSI report(s) including the effect of the timing advance, starts earlier than at symbol $Z_{ref}$, the UE may ignore the scheduling DCI if no HARQ-ACK or transport block is multiplexed on the PUSCH.

When the CSI request field on a DCI triggers a CSI report(s) on PUSCH, if the first uplink symbol to carry the n-th CSI report including the effect of the timing advance, starts earlier than at symbol $Z'_{ref}(n)$, the UE may ignore the scheduling DCI if the number of triggered reports is one and no HARQ-ACK or transport block is multiplexed on the PUSCH. Otherwise, the UE is not required to update the CSI for the n-th triggered CSI report.

Z, Z' and μ are defined as:

$$Z = \max_{m=0,\ldots,M-1}(Z(m)) \text{ and } Z' = \max_{m=0,\ldots,M-1}(Z'(m)),$$

where M is the number of updated CSI report(s) according to Clause 5.2.1.6, (Z(m), Z'(m)) corresponds to the m-th updated CSI report and is defined as $(Z_1, Z_1')$ of the table 5.4-1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $(Z_1, Z_1')$ of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $(Z_1, Z_1')$ of the table 5.4-2 if the CSI to be transmitted corresponds to wideband frequency-granularity where reportQuantity is set to 'ssb-Index-SINR', or reportQuantity is set to 'cri-SINR', or $(Z_3, Z_3')$ of the table 5.4-2 if reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306, or $(Z_2, Z_2')$ of table 5.4-2 otherwise.

$\mu$ of table 5.4-1 and table 5.4-2 corresponds to the min $(\mu_{PDCCH}, \mu_{CSI-RS}, \mu_{UL})$ where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI.

TABLE 5.4-1

| CSI computation delay requirement 1 | | |
|---|---|---|
| | $Z_1$ [symbols] | |
| $\mu$ | $Z_1$ | $Z'_1$ |
| 0 | 10 | 8 |
| 1 | 13 | 11 |
| 2 | 25 | 21 |
| 3 | 43 | 36 |

TABLE 5.4-2

| CSI computation delay requirement 2 | | | | | |
|---|---|---|---|---|---|
| | $Z_1$ [symbols] | | $Z_2$ [symbols] | | $Z_3$ [symbols] |
| $\mu$ | $Z_1$ | $Z'_1$ | $Z_2$ | $Z'_2$ | $Z_3$ | $Z'_3$ |
| 0 | 22 | 16 | 40 | 37 | 22 | X0 |
| 1 | 33 | 30 | 72 | 69 | 33 | X1 |
| 2 | 44 | 42 | 141 | 140 | $\min(44, X_2 + KB_1)$ | X2 |
| 3 | 97 | 85 | 152 | 140 | $\min(97, X_3 + KB_2)$ | X3 |

Regarding the PUSCH preparation time, Clause 6.4 of the 3GPP specification TS 38.214 specifies that if the first uplink symbol in the PUSCH allocation for a transport block, including the DM-RS, as defined by the slot offset K2 and the start and length indicator SLIV of the scheduling DCI and including the effect of the timing advance, is no earlier than at symbol $L_2$, where $L_2$ is defined as the next uplink symbol with its CP starting $T_{proc,2}=\max((N_2+d_{2,1})(2048+144)\cdot\kappa 2^{-\mu}\cdot T_C, d_{2,2})$ after the end of the reception of the last symbol of the PDCCH carrying the DCI scheduling the PUSCH, then the UE shall transmit the transport block.

$N_2$ is based on $\mu$ of Table 6.4-1 and Table 6.4-2 for UE processing capability 1 and 2 respectively, where p corresponds to the one of $(\mu_{DL}, \mu_{UL})$ resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in Clause 4.1 of TS 38.211.

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in TS 38.133.

If the scheduling DCI triggered a switch of BWP, $d_{2,2}$ equals to the switching time as defined in TS 38.133, otherwise $d_{2,2}=0$.

For a UE that supports capability 2 on a given cell, the processing time according to UE processing capability 2 is applied if the high layer parameter processingType2Enabled in PUSCH-ServingCellConfig is configured for the cell and set to enable, If the PUSCH indicated by the DCI is overlapping with one or more PUCCH channels, then the transport block is multiplexed following the procedure in Clause 9.2.5 of TS 38.213, otherwise the transport block is transmitted on the PUSCH indicated by the DCI.

Otherwise the UE may ignore the scheduling DCI.

The value of $T_{proc,2}$ is used both in the case of normal and extended cyclic prefix.

TABLE 6.4-1

| PUSCH preparation time for PUSCH timing capability 1 | |
|---|---|
| $\mu$ | PUSCH preparation time $N_2$ [symbols] |
| 0 | 10 |
| 1 | 12 |
| 2 | 23 |
| 3 | 36 |

TABLE 6.4-2

| PUSCH preparation time for PUSCH timing capability 2 | |
|---|---|
| $\mu$ | PUSCH preparation time $N_2$ [symbols] |
| 0 | 5 |
| 1 | 5.5 |
| 2 | 11 for frequency range 1 |

Typically, the duration of a symbol is associated with the subcarrier spacing (SCS). For example, if $\mu=0$ and SCS is 15 KHz, the symbol duration with normal CP is $(2048+144)/(15000*2048)$ seconds or 71.34 μs. If $\mu=1$ and SCS is 30 KHz, the symbol duration with normal CP is $(2048+144)/(30000*2048)$ seconds, that is, about 35.677 μS. If $\mu=2$ and SCS is 60 KHz, the symbol duration with normal CP is $(2048+144)/(60000*2048)$ seconds, that is, about 17.839 μS. If $\mu=3$ and SCS is 120 KHz, the symbol duration with normal CP is $(2048+144)/(120000*2048)$ seconds, that is, about 8.919 μS. If SCS is 240 KHz, the symbol duration with normal CP is $(2048+144)/(240000*2048)$ seconds, that is, about 4.460 μS. If SCS is 480 KHz, the symbol duration with normal CP is $(2048+144)/(480000*2048)$ seconds, that is, about 2.230 μs. If SCS is 960 KHz, the symbol duration with normal CP is $(2048+144)/(960000*2048)$ seconds, that is, about 1.150 μs. If SCS is 1920 KHz, the symbol duration with normal CP is $(2048+144)/(1920000*2048)$ seconds, that is, about 0.575 μs.

It can be seen from the above that, in case of higher frequency band with larger SCS, the number of slots for the PUSCH preparation time and/or the number of slots for the CSI computation time may increase. However, the slot offsets defined in accordance with the current range (such as, 0~32 slots) may be not sufficient for the UE to prepare the uplink data and/or the CSI report.

Moreover, according to the current specifications, if a UE is scheduled by a same DCI to transmit uplink data and a CSI report, for example, on a same PUSCH, the slot offset for the PUSCH carrying both the uplink data and the CSI report can be determined based on the slot offset configured for uplink data transmission.

In Clause 6.1.2.1 of the 3GPP specification TS 38.214, it is specified that when the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table. The determination of the used resource allocation table is defined in Clause 6.1.2.1.1 of TS 38.214. The indexed row defines the slot offset $K_2$, the start and length indicator SLIV, or directly the start symbol S and the allocation length L, the PUSCH mapping type, and the number of repetitions (if numberofrepetitions is present in the resource allocation table) to be applied in the PUSCH transmission.

When the UE is scheduled to transmit a PUSCH with no transport block and with a CSI report(s) by a CSI request field on a DCI, the Time domain resource assignment field value m of the DCI provides a row index m+1 to the allocated table as defined in Clause 6.1.2.1.1 of TS 38.214. The indexed row defines the start and length indicator SLIV, and the PUSCH mapping type to be applied in the PUSCH transmission and the $K_2$ value is determined as $$K_2 = \max_j Y_j(m+1),$$

where $Y_j$, j=0, . . . , $N_{Rep}-1$ are the corresponding list entries of the higher layer parameter reportSlotOffsetListForDCI-Format0-2, if PUSCH is scheduled by DCI format 0_2 and reportSlotOffsetList-ForDCI-Format0-2 is configured;

reportSlotOffsetListForDCI-Format0-1, if PUSCH is scheduled by DCI format 0_1 and reportSlotOffsetList-ForDCI-Format0-1 is configured;

reportSlotOffsetList, otherwise.

However, in case of higher frequency band with larger subcarrier spacing, the slot offset configured for the uplink data transmission may be not sufficient for the UE to prepare the CSI report. As such, the uplink data and the CSI report may not be able to be transmitted on a same PUSCH.

Embodiments of the present disclosure provide a solution for communication, so as to solve the above problems and one or more of other potential problems. According to this solution, DCI is transmitted from a network device to a terminal device for scheduling transmissions of data and CSI from the terminal device. The data is transmitted from the terminal device to the network device based on a first slot offset configured for uplink data transmission or a second slot offset configured for the CSI. The CSI is transmitted from the terminal device to the network device based on the second slot offset. As such, in case of higher frequency band with larger subcarrier spacing, embodiments of the present disclosure can support uplink data scheduling and A-CSI report triggering with same DCI.

Principle and implementations of the present disclosure will be described in detail below with reference to FIG. 1-8.

FIG. 1 shows an example communication network 100 in which implementations of the present disclosure can be implemented. The network 100 includes a network device 110 and a terminal device 120 served by the network device 110. The network 100 can provide at least one serving cell 102 to serve the terminal device 120. It is to be understood that the number of network devices, terminal devices and/or serving cells is only for the purpose of illustration without suggesting any limitations. The network 100 may include any suitable number of network devices, terminal devices and/or serving cells adapted for implementing implementations of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Every-thing (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS to the terminal device 120 in a downlink. Similarly, the terminal device 120 may transmit a RS to the network device 110 in an uplink. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. For another example, a RS sequence may be generated and transmitted by the terminal device 120 based on a certain rule and the network device 110 may deduce the RS sequence based on the same rule. Examples of the RS may include but are not limited to downlink or uplink Demodulation Reference Signal (DMRS), CSI-RS, Sounding Reference Signal (SRS), Phase Tracking Reference Signal (PTRS), Tracking Reference Signal (TRS), fine time-frequency Tracking Reference Signal (TRS), CSI-RS for tracking, Positioning Reference Signal (PRS) and so on.

Figure 2:
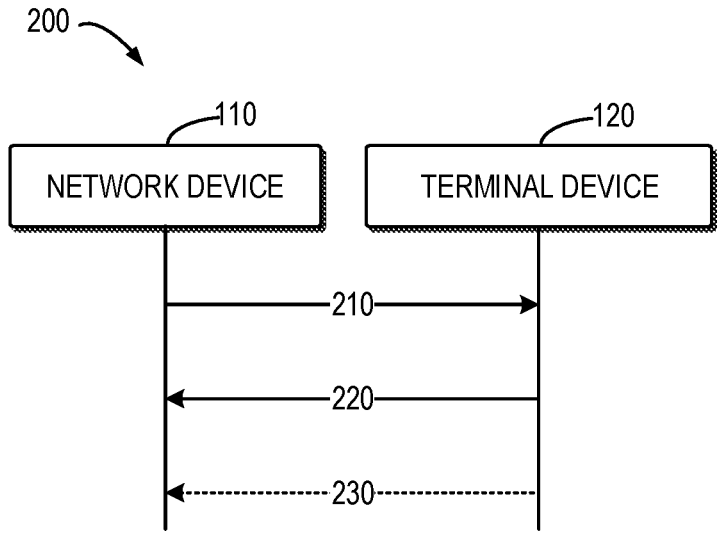
FIG. 2 illustrates an example process for communication in accordance with some embodiments of the present disclosure.

FIG. 2 shows a process 200 for communication according to some implementations of the present disclosure. For the purpose of discussion, the process 200 will be described with reference to FIG. 1. The process 200 may involve the network device 110 and the terminal device 120 as shown in FIG. 1. It is to be understood that the process 200 may include additional acts not shown and/or may omit some acts as shown, and the scope of the present disclosure is not limited in this regard.

As shown in FIG. 2, the network device 110 may transmits 210 DCI for scheduling transmissions of uplink data and a CSI report (for example, an A-CSI report) to the terminal device 120. The terminal device 120 may be configured with a first slot offset for uplink data transmission and a second slot offset for CSI reporting. For example, the first slot offset indicates a time interval between reception of an uplink grant (such as, DCI) and transmission of uplink data on a PUSCH. The second slot offset indicates a time interval between reception of a trigger (such as, DCI) for the A-CSI report and transmission of the A-CSI report. In some embodiments, in response to receiving the DCI from the network device 110, the terminal device 120 may transmit 220 the uplink data and the CSI report to the network device 110 on a PUSCH based on the second slot offset. Alternatively, in some embodiments, the terminal device 120 may transmit 220 the uplink data on a PUSCH based on the first slot offset configured for uplink data transmission and transmit 230 the CSI report on another PUSCH based on the second slot offset configured for the CSI report.

In some embodiments, a minimum value $k_{min}$ and/or a maximum value $k_{max}$ may be defined for the slot offset K configured for any of the following: PUSCH scheduling, PDSCH scheduling, HARQ-ACK feedback for a scheduled PDSCH, A-CSI reporting, aperiodic CSI-RS (A-CSI-RS) triggering, PUCCH transmission or aperiodic SRS (A-SRS) triggering. In some embodiments, $k_{min}$ is a positive integer and $k_{min} \leq K \leq k_{max}$. For example, $0 < k_{min} \leq 256$. In some embodiments, $k_{max}$ is a positive integer. For example, $32 \leq k_{max} \leq 512$. For another example, $k_{max}$ may be any one of $\{32, 64, 96, 128, 256, 512, 1024\}$. In some embodiments, for different values of SCS, the minimum value $k_{min}$ may be different. For example, it is assumed that if the value of SCS is SCS_a, the minimum value for the first slot offset may be $k_{min\_a}$ and if the value of SCS is SCS_b, the minimum value for the first slot offset may be $k_{min\_b}$. In some embodiments, if SCS_a>SCS_b, $k_{min\_a} \geq k_{min\_b}$. In some embodiments, for different values of SCS, the maximum value $k_{max}$ may be different. For example, it is assumed that if the value of SCS is SCS_a, the maximum value for the first slot offset may be $k_{max\_a}$ and if the value of SCS is SCS_b, the minimum value for the first slot offset may be $k_{max\_b}$. In some embodiments, if SCS_a>SCS_b, $k_{max\_a} \geq k_{max\_b}$. In some embodiments, the value of SCS may be configured for at least one of the following: PDCCH, PUCCH, PUSCH, PDSCH, A-CSI report, CSI-RS and SRS. In some embodiments, the above embodiments may be applied when the value of SCS is any of $\{240$ kHz, $480$ kHz, $960$ kHz, $1920$ kHz, $3840$ kHz$\}$. In some embodiments, if the minimum value $k_{min}$ and/or the maximum value $k_{max}$ is defined for the slot offset K configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{min}$ and/or the value of $k_{max}$ may be different.

In the present disclosure, the terms "PUSCH", "PUCCH", "PUSCH scheduling", "PUSCH transmission" and "PUCCH transmission" can be used interchangeably. The terms "PUSCH scheduling", "uplink data scheduling" and "HARQ-ACK feedback for a scheduled PDSCH" can be used interchangeably. The terms "PUSCH 1" and "PUCCH 1" can be used interchangeably. The terms "PUSCH 2" and "PUCCH 2" can be used interchangeably. In some embodiments, PUCCH 1 may be used for HARQ-ACK feedback for a scheduled PDSCH. In some embodiments, PUCCH 2 may be used for A-CSI report(s).

In some embodiments, the network device 110 may transmit a configuration indicative of the slot offset K to the terminal device 120. For example, the configuration may be transmitted via any of RRC signaling, MAC CE and DCI. In some embodiments, the network device 110 may transmit the configuration indicating a slot offset $K \in [k_{min}, k_{min}+1 \ldots k_{max}]$ to the terminal device 120, where $k_{min}$ and $k_{max}$ are both positive integers and $k_{min} \leq k_{max}$. In some embodiments, the configuration may directly indicate the slot offset K which ranges from the minimum value $k_{min}$ to the maximum value $k_{max}$, that is, $k_{min} \leq K \leq k_{max}$. In some embodiments, for different values of SCS, the value of $k_{min}$ and/or the value of $k_{max}$ may be different.

In some embodiments, if the slot offset K is configured for A-CSI report, the value of $k_{min}$ and/or the value of $k_{max}$ may be different for different values of SCS. For example, if the value of SCS is 240 kHz, the value of $k_{min}$ may be a positive integer and $4 \leq k_{min} \leq 24$. For another example, if the value of SCS is 480 kHz, the value of $k_{min}$ may be a positive integer and $8 \leq k_{min} \leq 48$. For another example, if the value of SCS is 960 kHz, the value of $k_{min}$ may be a positive integer and $16 \leq k_{min} \leq 96$. For another example, if the value of SCS is 1920 kHz, the value of $k_{min}$ may be a positive integer and $32 \leq k_{min} \leq 192$. For another example, if the value of SCS is 3840 kHz, the value of $k_{min}$ may be a positive integer and $64 \leq k_{min} \leq 384$.

In some embodiments, if the slot offset K is configured for A-CSI report, for different CSI report quantities and/or different numbers of CSI-RS ports in a resource and/or different numbers of occupied CPUs and/or different Code-bookTypes and/or different frequency granularity (for example, wideband or subband), the value of $k_{min}$ and/or the value of $k_{max}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $4 \leq k_{min} \leq 6$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $8 \leq k_{min} \leq 16$. For another example, if the CSI to be transmitted corresponds to wide-band frequency-granularity where reportQuantity is set to 'ssb-Index-SINR', or reportQuantity is set to 'cri-SINR', the value of $k_{min}$ may be 0 or the value of $k_{min}$ may be a positive integer and $8 \leq k_{min} \leq 16$. For another example, if reportQuan-tity is set to 'cri-RSRP' or 'ssb-Index-RSRP', where X$\mu$ is according to UE reported capability beamReportTiming and $KB_l$ is according to UE reported capability beamReportTim-ing as defined in TS 38.306, the value of $k_{min}$ may be 0 or the value of $k_{min}$ may be a positive integer and $20 \leq k_{min} \leq 40$ or $16 \leq k_{min} \leq 40$. Otherwise, in the case other than the fol-lowing: if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-Sin-glePanel' or where reportQuantity is set to 'cri-RI-CQI'; if the CSI to be transmitted corresponds to wideband fre-quency-granularity where the CSI corresponds to at most 4 CSI-RS ports in a single resource without CRI report and where CodebookType is set to 'typeI-SinglePanel' or where reportQuantity is set to 'cri-RI-CQI'; if the CSI to be transmitted corresponds to wideband frequency-granularity where reportQuantity is set to 'ssb-Index-SINR', or reportQuantity is set to 'cri-SINR'; and/or if reportQuantity is set to 'cri-RSRP' or 'ssb-Index-RSRP', where X$\mu$ is according to UE reported capability beamReportTiming and $KB_l$ is according to UE reported capability beamReportTim-ing as defined in TS 38.306; then the value of $k_{min}$ may be 0 or the value of $k_{min}$ may be a positive integer and $20 \leq k_{min} \leq 40$ or $16 \leq k_{min} \leq 40$. In some embodiments, the value of SCS may be any of 240 kHz, 480 kHz, 960 kHz, 1920 kHz and 3840 kHz. For example, the value of SCS is 240 kHz.

In some embodiments, if the slot offset K is configured for A-CSI report, for different CSI report quantities and/or different numbers of CSI-RS ports in a resource and/or different numbers of occupied CPUs and/or different Code-bookTypes and/or different frequency granularity (for example, wideband or subband), the value of $k_{min}$ and/or the value of $k_{max}$ may be different. For example, if the CSI is triggered without a PUSCH with either transport block or HARQ-ACK or both when L=0 CPUs are occupied (accord-ing to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $8 \leq k_{min} \leq 12$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $16 \leq k_{min} \leq 32$. For another example, if the CSI to be transmitted corresponds to wide-band frequency-granularity where reportQuantity is set to 'ssb-Index-SINR', or reportQuantity is set to 'cri-SINR', the value of $k_{min}$ may be 0 or the value of $k_{min}$ may be a positive integer and $16 \leq k_{min} \leq 32$. For another example, if reportQuantity is set to 'cri-RSRP' or 'ssb-Index-RSRP', where X$\mu$ is according to UE reported capability beamRe-portTiming and $KB_l$ is according to UE reported capability beamReportTiming as defined in TS 38.306, the value of $k_{min}$ may be 0 or the value of $k_{min}$ may be a positive integer and $40 \leq k_{min} \leq 80$ or $32 \leq k_{min} \leq 80$. In some embodiments, if at least one of the following conditions is not satisfied: the CSI is triggered without a PUSCH with either transport block or HARQ-ACK or both when L=0 CPUs are occupied (accord-ing to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be trans-mitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where X$\mu$ is according to UE reported capability beamRe-portTiming and $KB_l$ is according to UE reported capability beamReportTiming as defined in TS 38.306; then the value of $k_{min}$ may be 0 or the value of $k_{min}$ may be a positive integer and $40 \leq k_{min} \leq 80$ or $32 \leq k_{min} \leq 80$. In some embodi-ments, the value of SCS may be any of 240 kHz, 480 kHz, 960 kHz, 1920 kHz and 3840 kHz. For example, the value of SCS is 480 kHz.

In some embodiments, if the slot offset K is configured for A-CSI report, for different CSI report quantities and/or different numbers of CSI-RS ports in a resource and/or different numbers of occupied CPUs and/or different Code-bookTypes and/or different frequency granularity (for example, wideband or subband), the value of $k_{min}$ and/or the value of $k_{max}$ may be different. For example, if the CSI is triggered without a PUSCH with either transport block or HARQ-ACK or both when L=0 CPUs are occupied (accord-ing to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $16 \le k_{min} \le 24$. For another example, if the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI', the value of $k_{min}$ may be 0 or the value of $k_{min}$ may be a positive integer and $32 \le k_{min} \le 64$. For another example, if the CSI to be transmitted corresponds to wideband frequency-granularity where reportQuantity is set to 'ssb-Index-SINR', or reportQuantity is set to 'cri-SINR', the value of $k_{min}$ may be 0 or the value of $k_{min}$ may be a positive integer and $32 \le k_{min} \le 64$. For another example, if reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306, the value of $k_{min}$ may be 0 or the value of $k_{min}$ may be a positive integer and $80 \le k_{min} \le 160$ or $64 \le k_{min} \le 160$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306; then the value of $k_{min}$ may be 0 or the value of $k_{min}$ may be a positive integer and $80 \le k_{min} \le 160$ or $64 \le k_{min} \le 160$. In some embodiments, the value of SCS may be any of 240 kHz, 480 kHz, 960 kHz, 1920 kHz and 3840 kHz. For example, the value of SCS is 960 kHz.

In some embodiments, if the slot offset K is configured for A-CSI report, for different CSI report quantities and/or different numbers of CSI-RS ports in a resource and/or different numbers of occupied CPUs and/or different Code-bookTypes and/or different frequency granularity (for example, wideband or subband), the value of $k_{min}$ and/or the value of $k_{max}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $32 \le k_{min} \le 48$. For another example, if the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI', the value of $k_{min}$ may be 0 or the value of $k_{min}$ may be a positive integer and $64 \le k_{min} \le 128$. For another example, if the CSI to be transmitted corresponds to wideband frequency-granularity where reportQuantity is set to 'ssb-Index-SINR', or reportQuantity is set to 'cri-SINR', the value of $k_{min}$ may be 0 or the value of $k_{min}$ may be a positive integer and $64 \le k_{min} \le 128$. For another example, if reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306, the value of $k_{min}$ may be 0 or the value of $k_{min}$ may be a positive integer and $160 \le k_{min} \le 320$ or $128 \le k_{min} \le 320$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306; then the value of $k_{min}$ may be 0 or the value of $k_{min}$ may be a positive integer and $160 \le k_{min} \le 320$ or $128 \le k_{min} \le 320$. In some embodiments, the value of SCS may be any of 240 kHz, 480 kHz, 960 kHz, 1920 kHz and 3840 kHz. For example, the value of SCS is 1920 kHz.

In some embodiments, if the slot offset K is configured for A-CSI report, for different CSI report quantities and/or different numbers of CSI-RS ports in a resource and/or different numbers of occupied CPUs and/or different Code-bookTypes and/or different frequency granularity (for example, wideband or subband), the value of $k_{min}$ and/or the value of $k_{max}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{min}$ may be 0 or the value of $k_{min}$ may be a positive integer and $64 \le k_{min} \le 96$. For another example, if the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI', the value of $k_{min}$ may be 0 or the value of $k_{min}$ may be a positive integer and $128 \le k_{min} \le 256$. For another example, if the CSI to be transmitted corresponds to wideband frequency-granularity where reportQuantity is set to 'ssb-Index-SINR', or reportQuantity is set to 'cri-SINR', the value of $k_{min}$ may be 0 or the value of $k_{min}$ may be a positive integer and $128 \le k_{min} \le 256$. For another example, if reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306, the value of $k_{min}$ may be 0 or the value of $k_{min}$ may be a positive integer and $320 \leq k_{min} \leq 640$ or $256 \leq k_{min} \leq 640$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306; then the value of $k_{min}$ may be 0 or the value of $k_{min}$ may be a positive integer and $320 \leq k_{min} \leq 640$ or $256 \leq k_{min} \leq 640$. In some embodiments, the value of SCS may be any of 240 kHz, 480 kHz, 960 kHz, 1920 kHz and 3840 kHz. For example, the value of SCS is 3840 kHz.

In some embodiments, if the slot offset K is configured for PUSCH scheduling, the value of $k_{min}$ and/or the value of $k_{max}$ may be different for different values of SCS. For example, if the value of SCS is 240 kHz, the value of $k_{min}$ may be a positive integer and $4 \leq k_{min} \leq 12$ or $2 \leq k_{min} \leq 6$. For another example, if the value of SCS is 480 kHz, the value of $k_{min}$ may be a positive integer and $8 \leq k_{min} \leq 24$ or $5 \leq k_{min} \leq 12$. For another example, if the value of SCS is 960 kHz, the value of $k_{min}$ may be a positive integer and $16 \leq k_{min} \leq 48$ or $11 \leq k_{min} \leq 24$. For another example, if the value of SCS is 1920 kHz, the value of $k_{min}$ may be a positive integer and $32 \leq k_{min} \leq 96$ or $23 \leq k_{min} \leq 47$. For another example, if the value of SCS is 3840 kHz, the value of $k_{min}$ may be a positive integer and $64 \leq k_{min} \leq 192$ or $46 \leq k_{min} \leq 92$.

In some embodiments, if the slot offset K is configured for HARQ-ACK feedback of a scheduled PDSCH, the value of $k_{min}$ and/or the value of $k_{max}$ may be different for different values of SCS. For example, if the value of SCS is 240 kHz, the value of $k_{min}$ may be a positive integer and $2 \leq k_{min} \leq 9$. For another example, if the value of SCS is 480 kHz, the value of $k_{min}$ may be a positive integer and $5 \leq k_{min} \leq 18$. For another example, if the value of SCS is 960 kHz, the value of $k_{min}$ may be a positive integer and $10 \leq k_{min} \leq 36$. For another example, if the value of SCS is 1920 kHz, the value of $k_{min}$ may be a positive integer and $22 \leq k_{min} \leq 72$. For another example, if the value of SCS is 3840 kHz, the value of $k_{min}$ may be a positive integer and $44 \leq k_{min} \leq 144$.

In some embodiments, the network device 110 may transmit one or more configurations indicative of the slot offset K to the terminal device 120. For example, the one or more configurations may be transmitted via any of RRC signaling, MAC CE and DCI. In some embodiments, the network device 110 may transmit, to the terminal device 120, one configuration indicating a base slot offset $K_r \in [0, 1 \ldots 32]$ or $[0, 1 \ldots k_{max}]$ and another configuration indicating a relative offset $k_{offset}$, where $k_{offset}$ is a non-negative integer. For example, $0 \leq k_{offset} \leq 512$. For another example, $1 \leq k_{offset} \leq 512$. In some embodiments, the relative offset $k_{offset}$ can be determined based on the configuration indicating the base slot offset $K_r$. For example, the slot offset K may be determined based on the configuration indicating the base slot offset $K_r$ and the other configuration indicating the relative offset $k_{offset}$. Alternatively, the slot offset K may be determined based on the value of the base slot offset $K_r$ and the value of the relative slot offset $k_{offset}$. For example, the slot offset K may be: $K=K_r+k_{offset}$. In some embodiment, for different values of SCS, the value of the relative slot offset $k_{offset}$ may be different. In some embodiments, for different values of SCS, the value of $k_{offset}$ may be different. For example, it is assumed that if the value of SCS is SCS_a, the relative slot offset may be $k_{offset\_a}$ and if the value of SCS is SCS_b, the relative slot offset may be $k_{offset\_b}$. In some embodiments, if SCS_a>SCS_b, $k_{offset\_a} \geq k_{offset\_b}$. In some embodiments, the value of SCS may be configured for at least one of the following: PDCCH, PUCCH, PUSCH, PDSCH, A-CSI report, CSI-RS and SRS. In some embodiments, the above embodiments may be applied when the value of SCS is any of {240 kHz, 480 kHz, 960 kHz, 1920 kHz, 3840 kHz}. In some embodiments, if the relative offset $k_{offset}$ is defined for the slot offset K configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different.

In some embodiments, if the relative slot offset $k_{offset}$ is configured for A-CSI report, the value of $k_{offset}$ may be different for different values of SCS. For example, if the value of SCS is 240 kHz, the value of $k_{offset}$ may be a positive integer and $4 \leq k_{offset} \leq 24$. For another example, if the value of SCS is 480 kHz, the value of $k_{offset}$ may be a positive integer and $8 \leq k_{offset} \leq 48$. For another example, if the value of SCS is 960 kHz, the value of $k_{offset}$ may be a positive integer and $16 \leq k_{offset} \leq 96$. For another example, if the value of SCS is 1920 kHz, the value of $k_{offset}$ may be a positive integer and $32 \leq k_{offset} \leq 192$. For another example, if the value of SCS is 3840 kHz, the value of $k_{offset}$ may be a positive integer and $64 \leq k_{offset} \leq 384$.

In some embodiments, if the relative slot offset $k_{offset}$ is configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $4 \leq k_{offset} \leq 6$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $8 \leq k_{offset} \leq 16$. For another example, if the CSI to be transmitted corresponds to wideband frequency-granularity where reportQuantity is set to 'ssb-Index-SINR', or reportQuantity is set to 'cri-SINR', the value of $k_{offset}$ may be 0 or the value of $k_{offset}$ may be a positive integer and $8 \leq k_{offset} \leq 16$. For another example, if reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306, the value of $k_{offset}$ may be 0 or the value of $k_{offset}$ may be a positive integer and $20 \leq k_{offset} \leq 40$ or $16 \leq k_{offset} \leq 40$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306; then the value of $k_{offset}$ may be 0 or the value of $k_{offset}$ may be a positive integer and $20 \leq k_{offset} \leq 40$ or $16 \leq k_{offset} \leq 40$. In some embodiments, the value of SCS may be any of 240 kHz, 480 kHz, 960 kHz, 1920 kHz and 3840 kHz. For example, the value of SCS is 240 kHz.

In some embodiments, if the relative slot offset $k_{offset}$ is configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $8 \leq k_{offset} \leq 12$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $16 \leq k_{offset} \leq 32$. For another example, if the CSI to be transmitted corresponds to wideband frequency-granularity where reportQuantity is set to 'ssb-Index-SINR', or reportQuantity is set to 'cri-SINR', the value of $k_{offset}$ may be 0 or the value of $k_{offset}$ may be a positive integer and $16 \leq k_{offset} \leq 32$. For another example, if reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306, the value of $k_{offset}$ may be 0 or the value of $k_{offset}$ may be a positive integer and $40 \leq k_{offset} \leq 80$ or $32 \leq k_{offset} \leq 80$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306; then the value of $k_{offset}$ may be 0 or the value of $k_{offset}$ may be a positive integer and $40 \leq k_{offset} \leq 80$ or $32 \leq k_{offset} \leq 80$. In some embodiments, the value of SCS may be any of 40 kHz, 480 kHz, 960 kHz, 1920 kHz and 3840 kHz. For example, the value of SCS is 480 kHz.

In some embodiments, if the relative slot offset $k_{offset}$ is configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $16 \leq k_{offset} \leq 24$. For another example, if the CSI to be transmitted corresponds to wideband frequency-granularity where the CSI corresponds to at most 4 CSI-RS ports in a single resource without CRI report and where CodebookType is set to 'typeI-Sin-glePanel' or where reportQuantity is set to 'cri-RI-CQI', the value of $k_{offset}$ may be 0 or the value of $k_{offset}$ may be a positive integer and $32 \leq k_{offset} \leq 64$. For another example, if the CSI to be transmitted corresponds to wideband fre-quency-granularity where reportQuantity is set to 'ssb-Index-SINR', or reportQuantity is set to 'cri-SINR', the value of $k_{offset}$ may be 0 or the value of $k_{offset}$ may be a positive integer and $32 \leq k_{offset} \leq 64$. For another example, if reportQuantity is set to 'cri-RSRP' or 'ssb-Index-RSRP', where $X\mu$ is according to UE reported capability beamRe-portTiming and $KB_l$ is according to UE reported capability beamReportTiming as defined in TS 38.306, the value of $k_{offset}$ may be 0 or the value of $k_{offset}$ may be a positive integer and $80 \leq k_{offset} \leq 160$ or $64 \leq k_{offset} \leq 160$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where Xμ is according to UE reported capability beamReportTiming and $KB_l$ is according to UE reported capability beamReportTiming as defined in TS 38.306; then the value of $k_{offset}$ may be 0 or the value of $k_{offset}$ may be a positive integer and $80 \leq k_{offset} \leq 160$ or $64 \leq k_{offset} \leq 160$. In some embodiments, the value of SCS may be any of 240 kHz, 480 kHz, 960 kHz, 1920 kHz and 3840 kHz. For example, the value of SCS is 960 kHz.

In some embodiments, if the relative slot offset $k_{offset}$ is configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $32 \leq k_{offset} \leq 48$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $64 \leq k_{offset} \leq 128$. For another example, if the CSI to be transmitted corresponds to wideband frequency-granularity where reportQuantity is set to 'ssb-Index-SINR', or reportQuantity is set to 'cri-SINR', the value of $k_{offset}$ may be 0 or the value of $k_{offset}$ may be a positive integer and $64 \leq k_{offset} \leq 128$. For another example, if reportQuantity is set to 'cri-RSRP' or 'ssb-Index-RSRP', where Xμ is according to UE reported capability beamReportTiming and $KB_l$ is according to UE reported capability beamReportTiming as defined in TS 38.306, the value of $k_{offset}$ may be 0 or the value of $k_{offset}$ may be a positive integer and $160 \leq k_{offset} \leq 320$ or $128 \leq k_{offset} \leq 320$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where Xμ is according to UE reported capability beamReportTiming and $KB_l$ is according to UE reported capability beamReportTiming as defined in TS 38.306; then the value of $k_{offset}$ may be 0 or the value of $k_{offset}$ may be a positive integer and $160 \leq k_{offset} \leq 320$ or $128 \leq k_{offset} \leq 320$. In some embodiments, the value of SCS may be any of 240 kHz, 480 kHz, 960 kHz, 1920 kHz and 3840 kHz. For example, the value of SCS is 1920 kHz.

In some embodiments, if the relative slot offset $k_{offset}$ is configured for A-CSI report, for different CSI report quantities and/or different numbers of CSI-RS ports in a resource and/or different numbers of occupied CPUs and/or different CodebookTypes and/or different frequency granularity (for example, wideband or subband), the value of $k_{offset}$ may be different. For example, if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $64 \leq k_{offset} \leq 96$. For another example, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', the value of $k_{offset}$ may be 0 or the value of $k_{offset}$ may be a positive integer and $128 \leq k_{offset} \leq 256$. For another example, if the CSI to be transmitted corresponds to wideband frequency-granularity where reportQuantity is set to 'ssb-Index-SINR', or reportQuantity is set to 'cri-SINR', the value of $k_{offset}$ may be 0 or the value of $k_{offset}$ may be a positive integer and $128 \leq k_{offset} \leq 256$. For another example, if reportQuantity is set to 'cri-RSRP' or 'ssb-Index-RSRP', where Xμ is according to UE reported capability beamReportTiming and $KB_l$ is according to UE reported capability beamReportTiming as defined in TS 38.306, the value of $k_{offset}$ may be 0 or the value of $k_{offset}$ may be a positive integer and $320 \leq k_{offset} \leq 640$ or $256 \leq k_{offset} \leq 640$. In some embodiments, if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where Xμ is according to UE reported capability beamReportTiming and $KB_l$ is according to UE reported capability beamReportTiming as defined in TS 38.306; then the value of $k_{offset}$ may be 0 or the value of $k_{offset}$ may be a positive integer and $320 \leq k_{offset} \leq 640$ or $256 \leq k_{offset} \leq 640$. In some embodiments, the value of SCS may be any of 240 kHz, 480 kHz, 960 kHz, 1920 kHz and 3840 kHz. For example, the value of SCS is 3840 kHz.

In some embodiments, if the relative slot offset $k_{offset}$ is configured for PUSCH scheduling, the value of $k_{offset}$ may be different for different values of SCS. For example, if the value of SCS is 240 kHz, the value of $k_{offset}$ may be a positive integer and $4 \leq k_{offset} 12$ or $2 \leq k_{offset} \leq 6$. For another example, if the value of SCS is 480 kHz, the value of $k_{offset}$ may be a positive integer and $8 \leq k_{offset} \leq 24$ or $5 \leq k_{offset} \leq 12$. For another example, if the value of SCS is 960 kHz, the value of $k_{offset}$ may be a positive integer and $16 \leq k_{offset} \leq 48$ or $11 \leq k_{offset} \leq 24$. For another example, if the value of SCS is 1920 kHz, the value of $k_{offset}$ may be a positive integer and $32 \leq k_{offset} \leq 96$ or $23 \leq k_{offset} \leq 47$. For another example, if the value of SCS is 3840 kHz, the value of $k_{offset}$ may be a positive integer and $64 \leq k_{offset} \leq 192$ or $46 \leq k_{offset} \leq 92$.

In some embodiments, if the relative slot offset $k_{offset}$ is configured for HARQ-ACK feedback of a scheduled PDSCH, the value of $k_{offset}$ may be different for different values of SCS. For example, if the value of SCS is 240 kHz, the value of $k_{offset}$ may be a positive integer and $2 \leq k_{offset} \leq 9$. For another example, if the value of SCS is 480 kHz, the value of $k_{offset}$ may be a positive integer and $5 \leq k_{offset} \leq 18$. For another example, if the value of SCS is 960 kHz, the value of $k_{offset}$ may be a positive integer and $10 \leq k_{offset} \leq 36$. For another example, if the value of SCS is 1920 kHz, the value of $k_{offset}$ may be a positive integer and $22 \leq k_{offset} \leq 72$. For another example, if the value of SCS is 3840 kHz, the value of $k_{offset}$ may be a positive integer and $44 \leq k_{offset} \leq 144$.

Figure 3:
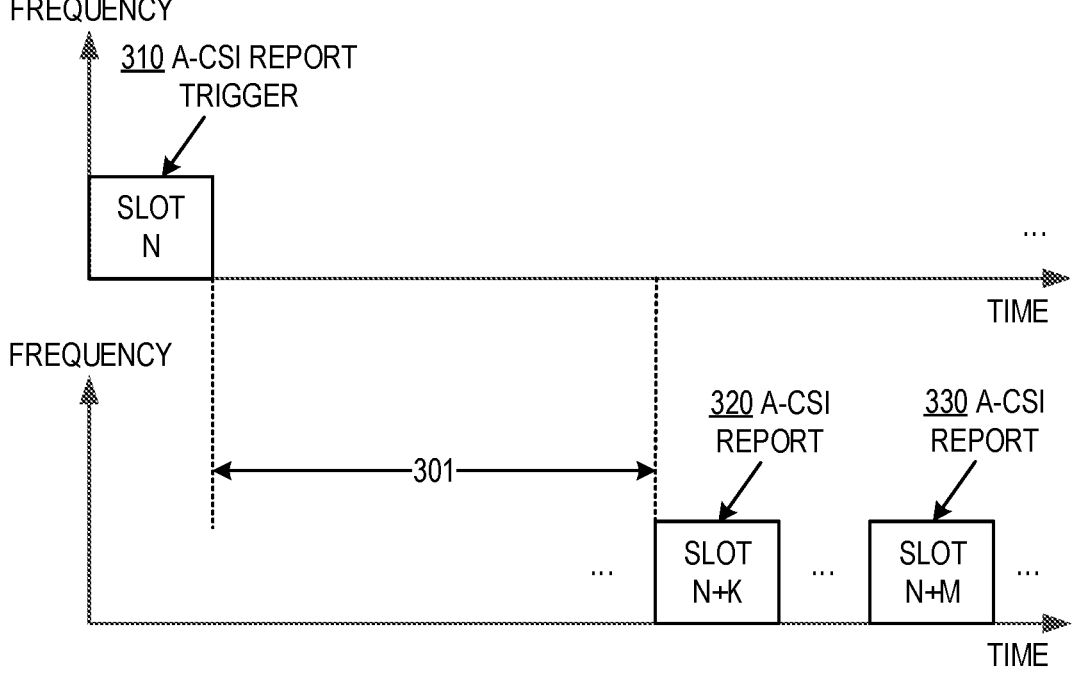
FIG. 3 illustrates an example of the minimum slot offset for CSI reporting in accordance with some embodiments of the present disclosure.

In some embodiments, the minimum value km, defined for the slot offset K configured for the A-CSI report may exceed 32 slots. FIG. 3 illustrates an example of such embodiments. As shown in FIG. 3, DCI including an A-CSI report trigger 310 may be transmitted from the network device 110 to the terminal device 120 in slot N. The A-CSI report trigger 310 may trigger one or more A-CSI reports 320 and 330 to be transmitted from the terminal device 120 to the network device 110. The minimum slot offset 301 for the A-CSI report may exceed 32 slots.

In some embodiments, the network device 110 may transmit a first configuration indicative of the first slot offset $K_1$ to the terminal device 120. For example, the first configuration may be transmitted via any of RRC signaling, MAC CE and DCI. In some embodiments, the first configuration may directly indicate the first slot offset $K_1$ which ranges from the minimum value $k_{min}$ to the maximum value $k_{max}$, that is, $k_{min} \leq K_1 \leq k_{max}$. Alternatively, the first configuration may indicate a base offset value $K_{1\_r}$, which ranges from 0 to 32, that is, $0 \leq K_{1\_r} \leq 32$. The first slot offset can be determined based on the based offset value $K_{1\_r}$ and a relative offset value $k_{offset}$, for example, $K_1 = K_{1\_r} + k_{offset}$. In some embodiment, the relative offset value $k_{offset}$ may be associated with the value of SCS. Additionally, in some embodiments, the network device 110 may transmit a second configuration indicative of the second slot offset to the terminal device 120. For example, the second configuration may be transmitted via any of RRC signaling, MAC CE and DCI. In some embodiments, the second configuration may directly indicate the second slot offset $K_2$ which ranges from the minimum value $k_{min}$ to the maximum value $k_{max}$, that is, $k_{min} \leq K_2 \leq k_{max}$. Alternatively, the second configuration may indicate a base offset value $K_{2\_r}$ which ranges from 0 to 32, that is, $0 \leq K_{2\_r} \leq 32$. The second slot offset can be determined based on the base offset value $K_{2\_r}$ and a relative offset value $k_{offset}$, for example, $K_2 = K_{2\_r} + k_{offset}$. In some embodiment, the relative offset value $k_{offset}$ may be associated with the value of SCS.

In some embodiments, the terminal device 120 may be configured with one or more slot offsets for CSI report(s). In response to receiving the DCI for scheduling transmissions of uplink data and a CSI report, the terminal device 120 may transmit the uplink data and the CSI report to the network device 110 on a PUSCH based on the maximum value of the one or more slot offsets configured for CSI report(s). In some embodiments, in case of large SCS (for example, the value of SCS is any of 240 KHz, 480 kHz, 960 kHz, 1920 kHz and 3840 kHz) and in cast that reportQuantity is set to 'cri-RSRP' or 'ssb-Index-RSRP', where Xμ is according to UE reported capability beamReportTiming and $KB_l$ is according to UE reported capability beamReportTiming as defined in TS 38.306, if a UE is scheduled to transmit a transport block and CSI report(s) on a PUSCH by DCI, the slot offset for the PUSCH may be determined based on the maximum value of the one or more slot offsets configured for CSI report(s). In some embodiments, in case of large SCS (for example, the value of SCS is any of 240 KHz, 480 kHz, 960 kHz, 1920 kHz and 3840 kHz) and in case that at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; if reportQuantity is set to 'cri-RSRP' or 'ssb-Index-RSRP', where Xμ is according to UE reported capability beamReportTiming and $KB_l$ is according to UE reported capability beamReportTiming as defined in TS 38.306; if a UE is scheduled to transmit a transport block and CSI report(s) on a PUSCH by DCI, the slot offset for the PUSCH may be determined based on the maximum value of the one or more slot offsets configured for CSI report(s).

In some embodiments, the terminal device 120 may be configured with one or more relative slot offsets for CSI report(s). In response to receiving the DCI for scheduling transmissions of uplink data and a CSI report, the terminal device 120 may transmit the uplink data and the CSI report to the network device 110 on a PUSCH based on the first slot offset $K_1$ configured for the uplink data transmission and the maximum value $k_{offset}$ max of the relative slot offsets configured for CSI report(s). In some embodiments, in case of large SCS (for example, the value of SCS is any of 240 KHz, 480 kHz, 960 kHz, 1920 kHz and 3840 kHz) and in cast that reportQuantity is set to 'cri-RSRP' or 'ssb-Index-RSRP', where Xμ is according to UE reported capability beamReportTiming and $KB_l$ is according to UE reported capability beamReportTiming as defined in TS 38.306, if a UE is scheduled to transmit a transport block and CSI report(s) on a PUSCH by DCI, the slot offset for the PUSCH may be determined based on the slot offset configured for the uplink data transmission $K_1$ and the maximum value $k_{offset\_max}$ of the relative slot offsets configured for CSI report(s). For example, the slot offset for the PUSCH transmission may be $K_1 + k_{offset\_max}$. In some embodiments, in case of large SCS (for example, the value of SCS is any of 240 KHz, 480 kHz, 960 kHz, 1920 kHz and 3840 kHz) and in cast that at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306,); if a UE is scheduled to transmit a transport block and CSI report(s) on a PUSCH by DCI, the slot offset for the PUSCH may be determined based on the slot offset configured for the uplink data transmission $K_1$ and the maximum value $k_{offset\_max}$ of the relative slot offsets configured for CSI report(s). For example, the slot offset for the PUSCH transmission may be $K_1 + k_{offset\_max}$.

Figure 4A:
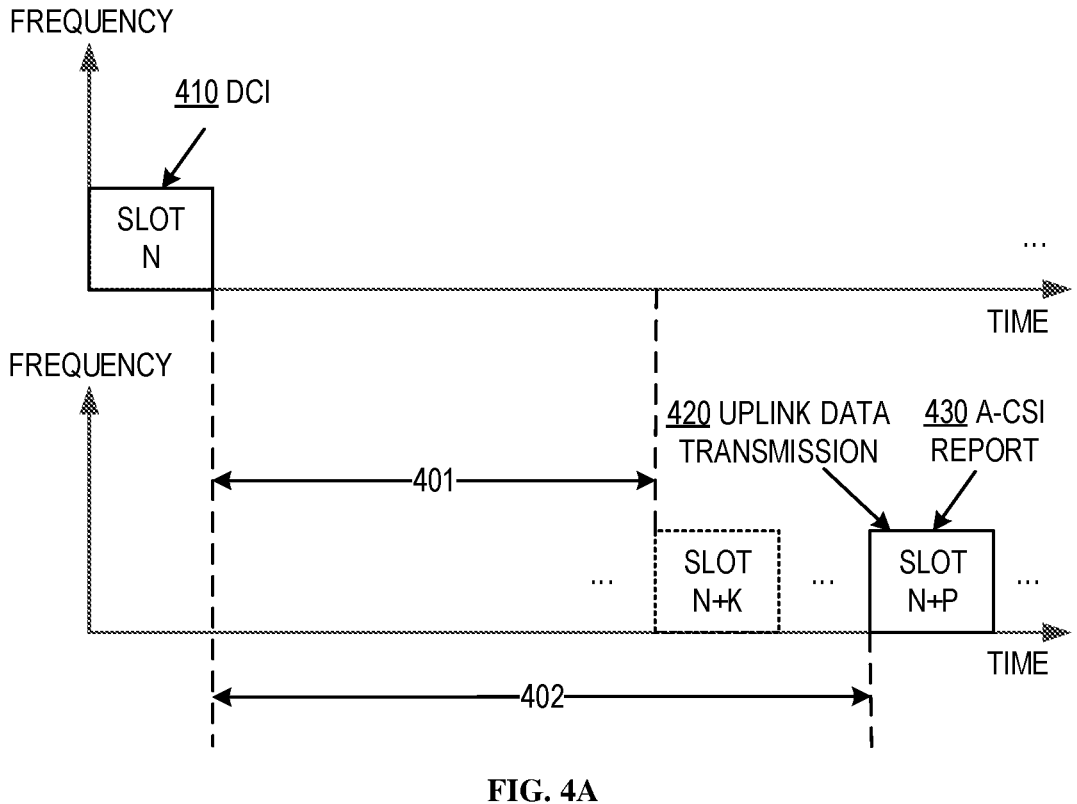
FIG. 4A illustrates an example of a multiplexed transmission of uplink data and A-CSI in accordance with some embodiments of the present disclosure.

FIG. 4A illustrates an example of a multiplexed transmission of uplink data and A-CSI in accordance with some embodiments of the present disclosure. As shown in FIG. 4A, DCI 410 for scheduling uplink data transmission and triggering A-CSI report is transmitted from the network device 110 to the terminal device 120 in slot N. A first slot offset 401 is configured for uplink data transmission and a second slot offset 402 is configured for the A-CSI reporting. For example, the first slot offset 401 indicates that the uplink data 420 is to be transmitted from the terminal device 120 to the network device in slot N+K. The second slot offset 402 indicates that the A-CSI report 430 is to be transmitted from the terminal device 120 to the network device in slot N+P. In some embodiments, the terminal device 120 may transmit both the uplink data 420 and the A-CSI report 430 to the network device 110 in the slot N+P.

In this event, regarding the multiplexed transmission of uplink data and A-CSI, Clause 6.1.2.1 of the 3GPP specification TS 38.214 can be updated accordingly. Several possible updates are listed as following.

In some embodiments, when the UE is scheduled to transmit a transport block and no CSI report, the Time domain resource assignment field value m of the DCI provides a row index m+1 to an allocated table. The determination of the used resource allocation table is defined in Clause 6.1.2.1.1 of TS 38.214. The indexed row defines the slot offset $K_2$, the start and length indicator SLIV, or directly the start symbol S and the allocation length L, the PUSCH mapping type, and the number of repetitions (if numberof-repetitions is present in the resource allocation table) to be applied in the PUSCH transmission.

Alternatively, when the UE is scheduled to transmit a PUSCH with no transport block and with a CSI report(s) by a CSI request field on a DCI, or the UE is scheduled to transmit a transport block and a CSI report(s) on PUSCH by a DCI, the Time domain resource assignment field value m of the DCI provides a row index m+1 to the allocated table as defined in Clause 6.1.2.1.1 of TS 38.214. The indexed row defines the start and length indicator SLIV, and the PUSCH mapping type to be applied in the PUSCH transmission and the $K_2$ value is determined as $$K_2 = \max_j \ Y_j(m+1), \ \text{where} \ Y_j, \ j = 0, \ldots, N_{Rep} - 1$$

are the corresponding list entries of the higher layer parameter.

Alternatively, when the UE is scheduled to transmit a transport block and no CSI report, or the UE is scheduled to transmit a transport block and a CSI report(s) on PUSCH by a DCI and the subcarrier spacing for PUSCH is configured as no larger than 120 kHz or 240 kHz or 480 kHz, the Time domain resource assignment field value m of the DCI provides a row index m+1 to an allocated table. The determination of the used resource allocation table is defined in Clause 6.1.2.1.1 of TS 38.214. The indexed row defines the slot offset $K_2$, the start and length indicator SLIV, or directly the start symbol S and the allocation length L, the PUSCH mapping type, and the number of repetitions (if numberof-repetitions is present in the resource allocation table) to be applied in the PUSCH transmission.

Alternatively, when the UE is scheduled to transmit a PUSCH with no transport block and with a CSI report(s) by a CSI request field on a DCI, or the UE is scheduled to transmit a transport block and a CSI report(s) on PUSCH by a DCI and the subcarrier spacing for PUSCH is configured as 240 kHz or 480 kHz or 960 kHz or 1920 kHz, the Time domain resource assignment field value m of the DCI provides a row index m+1 to the allocated table as defined in Clause 6.1.2.1.1 of TS 38.214. The indexed row defines the start and length indicator SLIV, and the PUSCH mapping type to be applied in the PUSCH transmission and the $K_2$ value is determined as $$K_2 = \max_j \ Y_j(m+1), \ \text{where} \ Y_j, \ j = 0, \ldots, N_{Rep} - 1$$

are the corresponding list entries of the higher layer parameter.

Alternatively, when the UE is scheduled to transmit a transport block and no CSI report, or the UE is scheduled to transmit a transport block and a CSI report(s) (if the maximum value of CSI computation delay requirement is no larger than X and/or if the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI' and/or if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI' and/or if the CSI to be transmitted corresponds to wideband frequency-granularity where reportQuantity is set to 'ssb-Index-SINR', or reportQuantity is set to 'cri-SINR' and/or if reportQuantity is set to 'cri-RSRP' or 'ssb-Index-RSRP', where $X\mu$ is according to UE reported capability beamReportTiming and $KB_l$ is according to UE reported capability beamReportTiming as defined in TS 38.306) on PUSCH by a DCI and the subcarrier spacing for PUSCH is configured as no larger than 120 kHz or 240 kHz or 480 kHz, the Time domain resource assignment field value m of the DCI provides a row index m+1 to an allocated table. The determination of the used resource allocation table is defined in Clause 6.1.2.1.1. The indexed row defines the slot offset K₂, the start and length indicator SLIV, or directly the start symbol S and the allocation length L, the PUSCH mapping type, and the number of repetitions (if numberofrepetitions is present in the resource allocation table) to be applied in the PUSCH transmission.

Alternatively, when the UE is scheduled to transmit a PUSCH with no transport block and with a CSI report(s) by a CSI request field on a DCI, or the UE is scheduled to transmit a transport block and a CSI report(s) (if the maximum value of CSI computation delay requirement is larger than X and/or if the CSI to be transmitted corresponds to wideband frequency-granularity where reportQuantity is set to 'ssb-Index-SINR', or reportQuantity is set to 'cri-SINR' and/or if reportQuantity is set to 'cri-RSRP' or 'ssb-Index-RSRP', where Xμ is according to UE reported capability beamReportTiming and KB$_l$ is according to UE reported capability beamReportTiming as defined in TS 38.306 and/or if at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; if the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; if the CSI to be transmitted corresponds to wideband frequency-granularity where reportQuantity is set to 'ssb-Index-SINR', or reportQuantity is set to 'cri-SINR'; if reportQuantity is set to 'cri-RSRP' or 'ssb-Index-RSRP', where Xμ is according to UE reported capability beamReportTiming and KB$_l$ is according to UE reported capability beamReportTiming as defined in TS 38.306) on PUSCH by a DCI and the subcarrier spacing for PUSCH is configured as 240 kHz or 480 kHz or 960 kHz, the Time domain resource assignment field value m of the DCI provides a row index m+1 to the allocated table as defined in Clause 6.1.2.1.1. The indexed row defines the start and length indicator SLIV, and the PUSCH mapping type to be applied in the PUSCH transmission and the K₂ value is determined as $$K_2 = \max_j Y_j(m+1), \quad \text{where} \quad Y_j, j = 0, \ldots, N_{Rep} - 1$$

are the corresponding list entries of the higher layer parameter.

Alternatively, when the UE is scheduled to transmit a transport block and no CSI report, or the UE is scheduled to transmit a transport block and a CSI report(s) except on PUSCH by a DCI, the Time domain resource assignment field value m of the DCI provides a row index m+1 to an allocated table. The determination of the used resource allocation table is defined in Clause 6.1.2.1.1. The indexed row defines the slot offset K₂, the start and length indicator SLIV, or directly the start symbol S and the allocation length L, the PUSCH mapping type, and the number of repetitions (if numberofrepetitions is present in the resource allocation table) to be applied in the PUSCH transmission.

Alternatively, when the UE is scheduled to transmit a PUSCH with no transport block and with a CSI report(s) by a CSI request field on a DCI, or the UE is scheduled to transmit a transport block and a CSI report(s) on PUSCH by a DCI, the Time domain resource assignment field value m of the DCI provides a row index m+1 to the allocated table as defined in Clause 6.1.2.1.1. The indexed row defines the start and length indicator SLIV, and the PUSCH mapping type to be applied in the PUSCH transmission and the K₂ value is determined as $$K_2 = \max_j Y_j(m+1), \quad \text{where} \quad Y_j, j = 0, \ldots, N_{Rep} - 1$$

are the corresponding list entries of the higher layer parameter.

As shown in FIG. 2, in some embodiments, in response to receiving the DCI for scheduling transmissions of uplink data and an A-CSI report, the terminal device 120 may transmit 220 the uplink data based on the first slot offset configured for uplink data transmission and transmit 230 the A-CSI report based on the second slot offset configured for the A-CSI reporting. In some embodiments, in case of large SCS (for example, the value of SCS is any of 240 KHz, 480 kHz, 960 kHz, 1920 kHz and 3840 kHz) and in cast that reportQuantity is set to 'cri-RSRP' or 'ssb-Index-RSRP', where Xμ is according to UE reported capability beamRe-portTiming and KB$_l$ is according to UE reported capability beamReportTiming as defined in TS 38.306, if a UE is scheduled to transmit a transport block and CSI report(s) on a PUSCH by DCI, the UE may transmit the transport block on a PUSCH (also referred to as "PUSCH 1" in the following) based on the first slot offset configured for uplink data transmission and transmit the CSI report(s) on another PUSCH (also referred to as "PUSCH 2" in the following) based on the second slot offset configured for the CSI report. In some embodiments, in case of large SCS (for example, the value of SCS is any of 240 KHz, 480 kHz, 960 kHz, 1920 kHz and 3840 kHz) and in case that at least one of the following conditions is not satisfied: the CSI is triggered without a PUSCH with either transport block or HARQ-ACK or both when L=0 CPUs are occupied (according to Clause 5.2.1.6 of TS 38.214) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'; the CSI to be transmitted corresponds to wideband frequency-granularity where the CSI corresponds to at most 4 CSI-RS ports in a single resource without CRI report and where Codebook-Type is set to 'typeI-SinglePanel' or where reportQuantity is set to 'cri-RI-CQI'; the CSI to be transmitted corresponds to wideband frequency-granularity where reportQuantity is set to 'ssb-Index-SINR', or reportQuantity is set to 'cri-SINR'; reportQuantity is set to 'cri-RSRP' or 'ssb-Index-RSRP', where Xμ is according to UE reported capability beamRe-portTiming and KB$_l$ is according to UE reported capability beamReportTiming as defined in TS 38.306; if a UE is scheduled to transmit a transport block and CSI report(s) on a PUSCH by DCI, the UE may transmit the transport block on a PUSCH (also referred to as "PUSCH 1" in the following) based on the first slot offset configured for uplink data transmission and transmit the CSI report(s) on another PUSCH (also referred to as "PUSCH 2" in the following) based on the second slot offset configured for the CSI report.

Figure 4B:
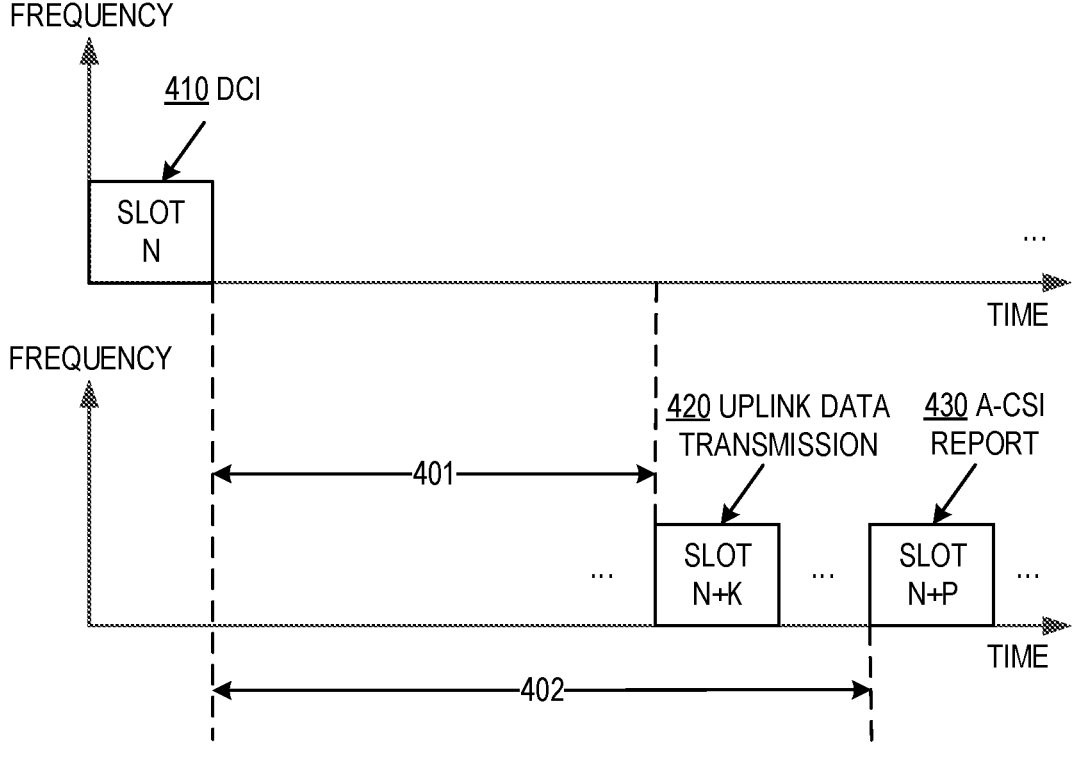
FIG. 4B illustrates an example of separate transmissions of uplink data and A-CSI in accordance with some embodiments of the present disclosure.

FIG. 4B illustrates an example of separate transmissions of uplink data and A-CSI in accordance with some embodiments of the present disclosure. As shown in FIG. 4B, DCI 410 for scheduling uplink data transmission and triggering A-CSI report is transmitted from the network device 110 to the terminal device 120 in slot N. A first slot offset 401 is configured for uplink data transmission and a second slot offset 402 is configured for the A-CSI reporting. For example, the first slot offset 401 indicates that the uplink data 420 is to be transmitted from the terminal device 120 to the network device in slot N+K. The second slot offset 402 indicates that the A-CSI report 430 is to be transmitted from the terminal device 120 to the network device in slot N+P. In some embodiments, the terminal device 120 may transmit the uplink data 420 to the network device 110 in the slot N+K and transmit the A-CSI report 430 to the network device 110 in the slot N+P.

In some embodiments, a set of time and frequency resources may be allocated for uplink data transmission. For example, the network device 110 may transmit a third configuration indicative of the set of time and frequency resources allocated for uplink data transmission to the terminal device 120. For example, the third configuration may be transmitted via any of RRC signaling, MAC CE and DCI. In some embodiments, the terminal device 120 may transmit, to the network device 110, the uplink data on PUSCH 1 by using the allocated set of time and frequency resources. For example, the time domain resource allocation for uplink data transmission or for PUSCH 1 may indicate a starting symbol index S (For example, S is an integer and $0 \leq S \leq 13$) and the number of consecutive symbols L (For example, L is an integer and $1 \leq L \leq 14$. In some embodiments, the terminal device 120 may transmit, to the network device 110, the A-CSI report on PUSCH 2 by using a part of the set of time and frequency resources. That is, the amount of time and frequency resources for A-CSI reporting are less than the amount of time and frequency resources allocated for uplink data transmission. In some embodiments, for example, the amount of frequency resources for A-CSI reporting may be the same as the amount of frequency resources allocated for uplink data transmission, while the amount of time resources for A-CSI reporting may be less than the amount of time resources allocated for uplink data transmission. In some embodiments, the time domain resource allocation for A-CSI report(s) or for PUSCH 2 may indicate a starting symbol index S. For example, S is an integer and $0 \leq S \leq 13$. For example, the value of S for A-CSI report(s) or for PUSCH 2 may be the same as the value of S for uplink data transmission or for PUSCH 1. In some embodiments, the number of consecutive symbols for A-CSI report(s) or for PUSCH 2 may be $L_A$. For example, $L_A$ is an integer and $1 \leq L_A \leq L$.

In some embodiments, the number of consecutive symbols for A-CSI report(s) or for PUSCH 2 may be determined based on the minimum number of symbols which can carry the payload of the A-CSI report(s).

In some embodiments, if CSI is present for transmission on the PUSCH, $$\text{Set } m_{count}^{CSI\text{-}part1}(1) = 0;$$
$$\text{Set } m_{count}^{CSI\text{-}part1}(2) = 0;$$
$$\text{Set } m_{count,all}^{CSI\text{-}part1} = 0;$$
$$\text{for } i = 1 \text{ to } N_{hop}^{PUSCH}$$
$$\quad l = l_{CSI}^{(i)};$$

-continued $$\text{while } \overline{M}_{sc}^{UCI}(l) - \overline{M}_{sc,rvd}^{\Phi}(l) \leq 0$$
$$\quad l = l + 1;$$
$$\text{end while}$$
$$\text{while } m_{count}^{CSI\text{-}part1}(i) < G^{CSI\text{-}part1}(i)$$
$$\quad \text{if } \overline{M}_{sc}^{UCI}(l) - \overline{M}_{sc,rvd}^{\Phi}(l) > 0$$
$$\quad\quad \text{if } G^{CSI\text{-}part1}(i) - m_{count}^{CSI\text{-}part1}(i) \geq (\overline{M}_{sc}^{UCI}(l) - \overline{M}_{sc,rvd}^{\Phi}(l)) \cdot N_L \cdot Q_m$$
$$\quad\quad\quad d = 1;$$
$$\quad\quad\quad m_{count}^{RE} = \overline{M}_{sc}^{UCI}(l) - \overline{M}_{sc,rvd}^{\Phi}(l);$$
$$\quad\quad \text{end if}$$
$$\quad\quad \text{if } G^{CSI\text{-}part1}(i) - m_{count}^{CSI\text{-}part1}(i) < (\overline{M}_{sc}^{UCI}(l) - \overline{M}_{sc,rvd}^{\Phi}(l)) \cdot N_L \cdot Q_m$$
$$\quad\quad\quad d = \lfloor (\overline{M}_{sc}^{UCI}(l) - \overline{M}_{sc,rvd}^{\Phi}(l)) \cdot N_L \cdot Q_m / (G^{CSI\text{-}part1}(i) - m_{count}^{CSI\text{-}part1}(i)) \rfloor;$$
$$\quad\quad\quad m_{count}^{RE} = \lceil (G^{CSI\text{-}part1}(i) - m_{count}^{CSI\text{-}part1}(i))/(N_L \cdot Q_m) \rceil;$$
$$\quad\quad \text{end if}$$
$$\quad\quad \Phi_l^{temp} = \Phi_l^{UCI} \backslash \Phi_l^{rvd};$$
$$\quad\quad \text{for } j = 0 \text{ to } m_{count}^{RE} - 1$$
$$\quad\quad\quad k = \overline{\Phi}_l^{temp}(j \cdot d);$$
$$\quad\quad\quad \text{for } v = 0 \text{ to } N_L \cdot Q_m - 1$$
$$\quad\quad\quad\quad \overline{g}_{l,k,v} = g_{m_{count,all}^{CSI\text{-}part1}}^{CSI\text{-}part1};$$
$$\quad\quad\quad\quad m_{count,all}^{CSI\text{-}part1} = m_{count,all}^{CSI\text{-}part1} + 1;$$
$$\quad\quad\quad\quad m_{count}^{CSI\text{-}part1}(i) = m_{count}^{CSI\text{-}part1}(i) + 1;$$
$$\quad\quad\quad \text{end for}$$
$$\quad\quad \text{end for}$$
$$\quad\quad \Phi_{l,tmp}^{UCI} = \emptyset;$$
$$\quad\quad \text{for } j = 0 \text{ to } m_{count}^{RE} - 1$$
$$\quad\quad\quad \Phi_{l,tmp}^{UCI} = \Phi_{l,tmp}^{UCI} \cup \overline{\Phi}_l^{UCI}(j \cdot d);$$
$$\quad\quad \text{end for}$$
$$\quad\quad \Phi_l^{UCI} = \Phi_l^{UCI} \backslash \Phi_{l,tmp}^{UCI};$$
$$\quad\quad \Phi_l^{UL\text{-}SCH} = \Phi_l^{UL\text{-}SCH} \backslash \Phi_{l,tmp}^{UCI};$$
$$\quad\quad \overline{M}_{sc}^{UCI}(l) = |\Phi_l^{UCI}|;$$
$$\quad\quad \overline{M}_{sc}^{UL\text{-}SCH}(l) = |\Phi_l^{UL\text{-}SCH}|;$$
$$\quad \text{end if}$$
$$\quad l = l + 1;$$
$$\text{end while}$$
$$\text{end for}$$
$$\text{Set } m_{count}^{CSI\text{-}part2}(2) = 0;$$
$$\text{Set } m_{count}^{CSI\text{-}part2}(2) = 0;$$
$$\text{Set } m_{count,all}^{CSI\text{-}part2}(2) = 0;$$
$$\text{for } i = 1 \text{ to } N_{hop}^{PUSCH}$$
$$\quad l = l_{CSI}^{(i)};$$
$$\quad \text{while } \overline{M}_{sc}^{UCI} \leq 0$$
$$\quad\quad l = l + 1;$$
$$\quad \text{end while}$$
$$\quad \text{while } m_{count}^{CSI\text{-}part2}(i) < G^{CSI\text{-}part2}(i)$$
$$\quad\quad \text{if } \overline{M}_{sc}^{UCI}(l) > 0$$
$$\quad\quad\quad \text{if } G^{CSI\text{-}part2}(i) - m_{count}^{CSI\text{-}part2}(i) \geq \overline{M}_{sc}^{UCI}(l) \cdot N_L \cdot Q_m$$
$$\quad\quad\quad\quad d = 1;$$
$$\quad\quad\quad\quad m_{count}^{RE} = \overline{M}_{sc}^{UCI}(l);$$
$$\quad\quad\quad \text{end if}$$
$$\quad\quad\quad \text{if } G^{CSI\text{-}part2}(i) - m_{count}^{CDI\text{-}part2}(i) < \overline{M}_{sc}^{UCI}(l) \cdot N_L \cdot Q_m$$
$$\quad\quad\quad\quad d = \lfloor \overline{M}_{sc}^{UCI}(l) \cdot N_L \cdot Q_m / (G^{CSI\text{-}part2}(i) - m_{count}^{CSI\text{-}part2}(i)) \rfloor;$$
$$\quad\quad\quad\quad m_{count}^{RE} = \lceil (G^{CSI\text{-}part2}(i) - m_{count}^{CDI\text{-}part2}(i))/(N_L \cdot Q_m) \rceil;$$
$$\quad\quad\quad \text{end if}$$
$$\quad\quad\quad \text{for } j = 0 \text{ to } m_{count}^{RE} - 1$$
$$\quad\quad\quad\quad k = \overline{\Phi}_l^{UCI}(j \cdot d);$$
$$\quad\quad\quad\quad \text{for } v = 0 \text{ to } N_L \cdot Q_m - 1$$
$$\quad\quad\quad\quad\quad \overline{g}_{l,k,v} = g_{m_{count,all}^{CSI\text{-}part2}}^{CSI\text{-}part2};$$
$$\quad\quad\quad\quad\quad m_{count,all}^{CSI\text{-}part2} = m_{count,all}^{CSI\text{-}part2} + 1;$$
$$\quad\quad\quad\quad\quad m_{count}^{CSI\text{-}part2}(i) = m_{count}^{CSI\text{-}part2}(i) + 1;$$
$$\quad\quad\quad\quad \text{end for}$$
$$\quad\quad\quad \text{end for}$$
$$\quad\quad\quad \Phi_{l,tmp}^{UCI} = \emptyset;$$
$$\quad\quad\quad \text{for } j = 0 \text{ to } m_{count}^{RE} - 1$$
$$\quad\quad\quad\quad \Phi_{l,tmp}^{UCI} = \Phi_{l,tmp}^{UCI} \cup \overline{\Phi}_l^{UCI}(j \cdot d);$$
$$\quad\quad\quad \text{end for}$$
$$\quad\quad\quad \Phi_l^{UCI} = \Phi_l^{UCI} \backslash \Phi_{l,tmp}^{UCI};$$
$$\quad\quad\quad \Phi_l^{UL\text{-}SCH} = \Phi_l^{UL\text{-}SCH} \backslash \Phi_{l,tmp}^{UCI};$$
$$\quad\quad\quad \overline{M}_{sc}^{UCI}(l) = |\Phi_l^{UCI}|;$$
$$\quad\quad\quad \overline{M}_{sc}^{UL\text{-}SCH}(l) = |\Phi_l^{UL\text{-}SCH}|;$$
$$\quad\quad \text{end if}$$
$$\quad\quad l = l + 1;$$

-continued

```
      end while
    end for
  end if
``` where $\overline{M}_{sc,rvd}^{\bar{\phi}}(1) = 0$.

In some embodiments, the number of symbols for PUSCH 2 may be the final value of 1 as described above. For example, $L_A$=1.

Figure 5A:
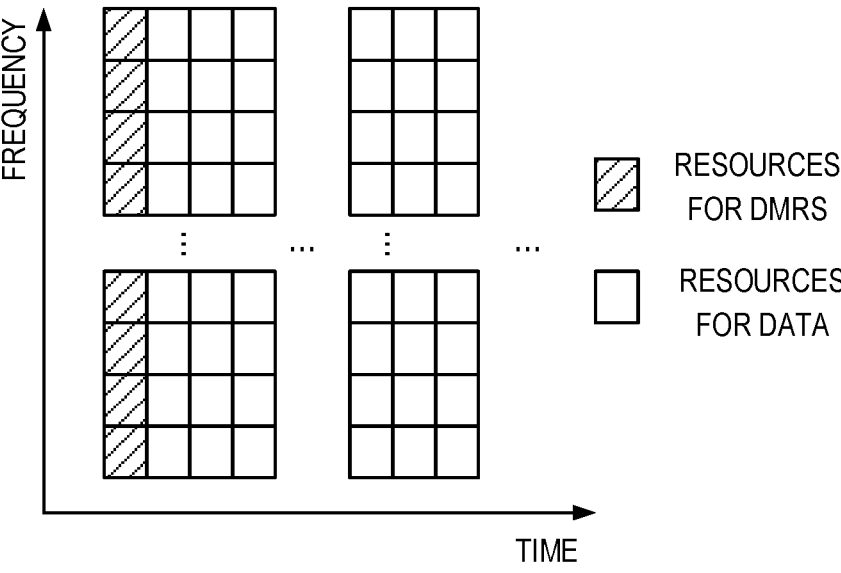
FIG. 5A-5B illustrate an example of resource allocation for separate transmissions of data and CSI in accordance with some embodiments of the present disclosure.
Figure 5B:
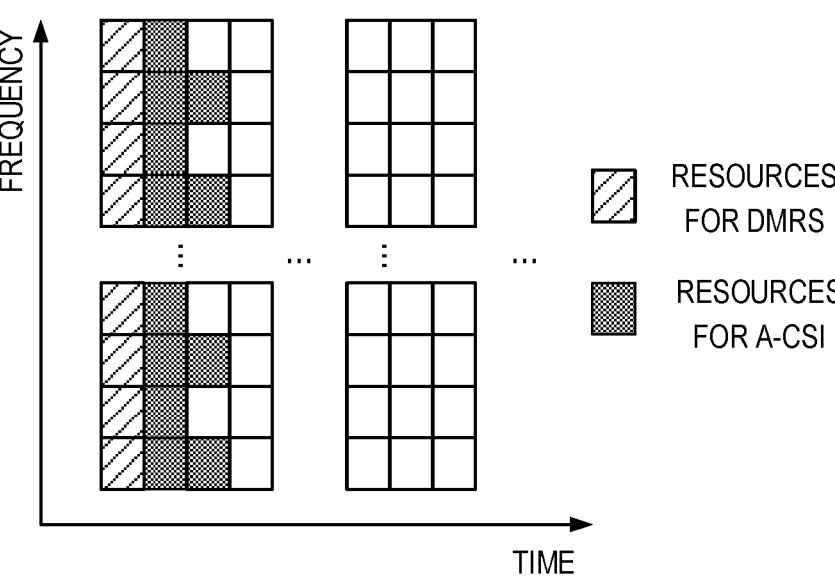

FIG. 5A-5B illustrate an example of such embodiments. FIG. 5A shows time and frequency resources allocated for uplink data transmission. For example, the terminal device 120 may transmit, to the network device 110, the uplink data on PUSCH 1 by using the time and frequency resources as shown in FIG. 5A. FIG. 5B shows time and frequency resources for A-CSI reporting. As shown in FIG. 5B, the amount of frequency resources for A-CSI reporting is the same as the amount of frequency resources allocated for uplink data transmission, while the amount of time resources for A-CSI reporting is less than the amount of time resources allocated for uplink data transmission. In some embodiments, the number of symbols used for A-CSI reporting can be determined based on the minimum number of symbol for the A-CSI payload.

Figure 6:
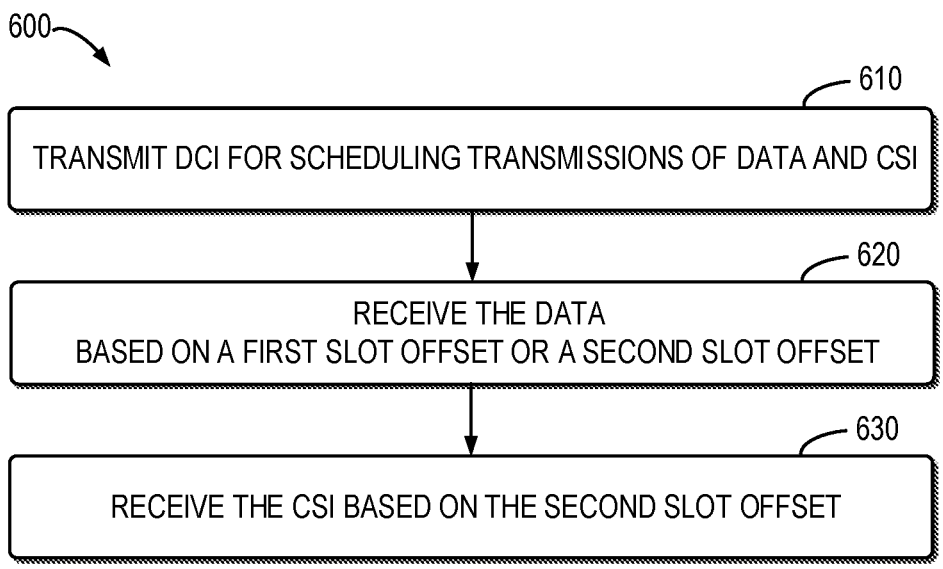
FIG. 6 illustrates a flowchart of an example method in accordance with some embodiments of the present disclosure.

FIG. 6 illustrates a flowchart of an example method 600 in accordance with some embodiments of the present disclosure. The method 600 can be performed at the network device 110 as shown in FIG. 1 and/or FIG. 2. It is to be understood that the method 600 may include additional blocks not shown and/or may omit some blocks as shown, and the scope of the present disclosure is not limited in this regard.

At block 610, the network device 110 transmits, to the terminal device 120, DCI for scheduling transmissions of data and CSI from the terminal device 120.

At block 620, the network device 110 receives the data from the terminal device 120 based on a first slot offset configured for UL data transmission or a second slot offset configured for the CSI.

At block 630, the network device 110 receives the CSI from the terminal device 120 based on the second slot offset.

In some embodiments, the first slot offset may range from a minimum slot offset to a maximum slot offset, where the minimum slot offset exceeds 0.

In some embodiments, the second slot offset may range from a minimum slot offset to a maximum slot offset, where the minimum slot offset exceeds 0.

In some embodiments, the minimum slot offset may be associated with subcarrier spacing configured for an uplink channel carrying the data and/or the CSI.

In some embodiments, the network device 110 may transmit a first configuration indicative of the first slot offset and a second configuration indicative of the second slot offset to the terminal device 120.

In some embodiments, at least one of the first configuration and the second configuration may be transmitted via any of RRC signaling, MAC CE and DCI.

In some embodiments, the network device 110 may receive, based on the first slot offset, the data from the terminal device 120 over a set of resources allocated for the UL data transmission. The network device 110 may receive, based on the first slot offset, the CSI from the terminal device 120 over a part of the set of resources.

In some embodiments, the network device 110 may transmit, to the terminal device 120, a third configuration indicative of the set of resources allocated for the UL data transmission.

Figure 7:
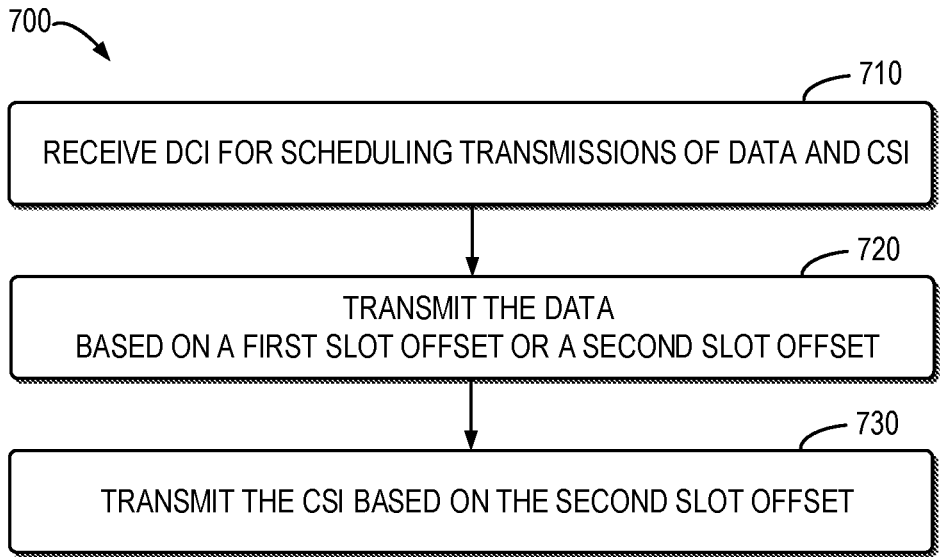
FIG. 7 illustrates a flowchart of an example method in accordance with some embodiments of the present disclosure.

FIG. 7 illustrates a flowchart of an example method 700 in accordance with some embodiments of the present disclosure. The method 700 can be performed at the terminal device 120 as shown in FIG. 1 and/or FIG. 2. It is to be understood that the method 700 may include additional blocks not shown and/or may omit some blocks as shown, and the scope of the present disclosure is not limited in this regard.

At block 710, the terminal device 120 receives, from the network device 110, DCI for scheduling transmissions of data and CSI from the terminal device 120.

At block 720, the terminal device 120 transmits the data to the network device 110 based on a first slot offset configured for uplink data transmission or a second slot offset configured for the CSI.

At block 730, the terminal device 120 transmits the CSI to the network device 110 based on the second slot offset.

In some embodiments, the first slot offset may range from a minimum slot offset to a maximum slot offset, where the minimum slot offset exceeds 0.

In some embodiments, the second slot offset may range from a minimum slot offset to a maximum slot offset, where the minimum slot offset exceeds 0.

In some embodiments, the minimum slot offset may be associated with subcarrier spacing configured for an uplink channel carrying the data and/or the CSI.

In some embodiments, the terminal device 120 may receive a first configuration indicative of the first slot offset and a second configuration indicative of the second slot offset from the network device 110.

In some embodiments, at least one of the first configuration and the second configuration may be received via any of RRC signaling, MAC CE and DCI.

In some embodiments, the terminal device 120 may transmit, based on the first slot offset, the data to the network device 110 over a set of resources allocated for the uplink data transmission. The terminal device 120 may transmit, based on the first slot offset, the CSI to the network device 110 over a part of the set of resources.

In some embodiments, the terminal device 120 may receive, from the network device 110, a third configuration indicative of the set of resources allocated for the uplink data transmission.

Figure 8:
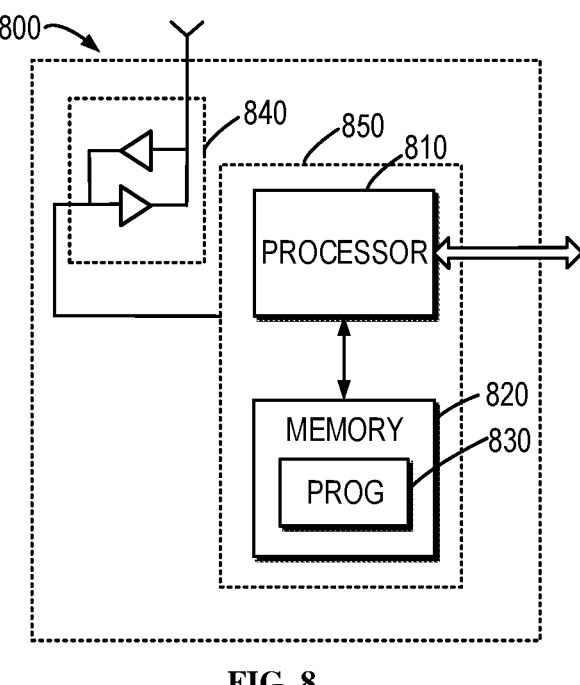
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the network device 110 or the terminal device 120 as shown in FIG. 1 and/or FIG. 2. Accordingly, the device 800 can be implemented at or as at least a part of the network device 110 or the terminal device 120 as shown in FIG. 1 and/or FIG. 2.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 6 and/or FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

receiving, from a network device, a downlink control information (DCI) indicating a slot offset, wherein a first candidate value of the slot offset ranges from 0 to 32 in a case where a first subcarrier spacing (SCS) is configured and a second candidate value of the slot offset ranges from 0 to 128 in a case where a second SCS is configured, and a subcarrier spacing value of the first SCS is less than a subcarrier spacing value of the second SCS, and wherein the subcarrier spacing value of the second SCS is 480 kHz or 960 kHz; and transmitting, to the network device, a channel state information (CSI) report triggered by the DCI based on the slot offset.

2. The method of claim 1, further comprising:

ignoring the DCI in a case where a first uplink symbol to carry the CSI report starts earlier than a first symbol configured for the second SCS.

3. The method of claim 2, wherein the first symbol configured for the second SCS with the subcarrier spacing value of 960 kHz starts later than the first symbol configured for the second SCS with the subcarrier spacing value of 480 kHz.

4. A terminal device, comprising:

at least one processor configured to cause the terminal device to:

receive, from a network device, a downlink control information (DCI) indicating a slot offset, wherein a first candidate value of the slot offset ranges from 0 to 32 when a first subcarrier spacing (SCS) is configured and a second candidate value of the slot offset ranges from 0 to 128 when a second SCS is configured, and a subcarrier spacing value of the first SCS is less than a subcarrier spacing value of the second SCS, and wherein the subcarrier spacing value of the second SCS is 480 kHz or 960 kHz; and transmit, to the network device, a channel state information (CSI) report triggered by the DCI based on the slot offset.

5. The terminal device of claim 4, wherein the at least one processor is further configured to cause the terminal device to:

ignore the DCI in a case where a first uplink symbol to carry the CSI report starts earlier than a first symbol configured for the second SCS.

6. The terminal device of claim 5, wherein the first symbol configured for the second SCS with the subcarrier spacing value of 960 kHz starts later than the first symbol configured for the second SCS with the subcarrier spacing value of 480 kHz.

7. A method performed by a network device, the method comprising:

transmitting to a terminal device, a downlink control information (DCI) indicating a slot offset, wherein a first candidate value of the slot offset ranges from 0 to 32 in a case where a first subcarrier spacing (SCS) is configured and a second candidate value of the slot offset ranges from 0 to 128 in a case where a second SCS is configured, a subcarrier spacing value of the first SCS is less than a subcarrier spacing value of the second SCS, and wherein the subcarrier spacing value of the second SCS is 480 kHz or 960 kHz; and receiving, from the terminal device, a channel state information (CSI) report triggered by the DCI based on the slot offset.

8. The method of claim 7, wherein the first symbol configured for the second SCS with the subcarrier spacing value of 960 kHz starts later than the first symbol configured for the second SCS with the subcarrier spacing value of 480 kHz.

\* \* \* \* \*